United States Patent Office 3,056,920
Patented Oct. 2, 1962

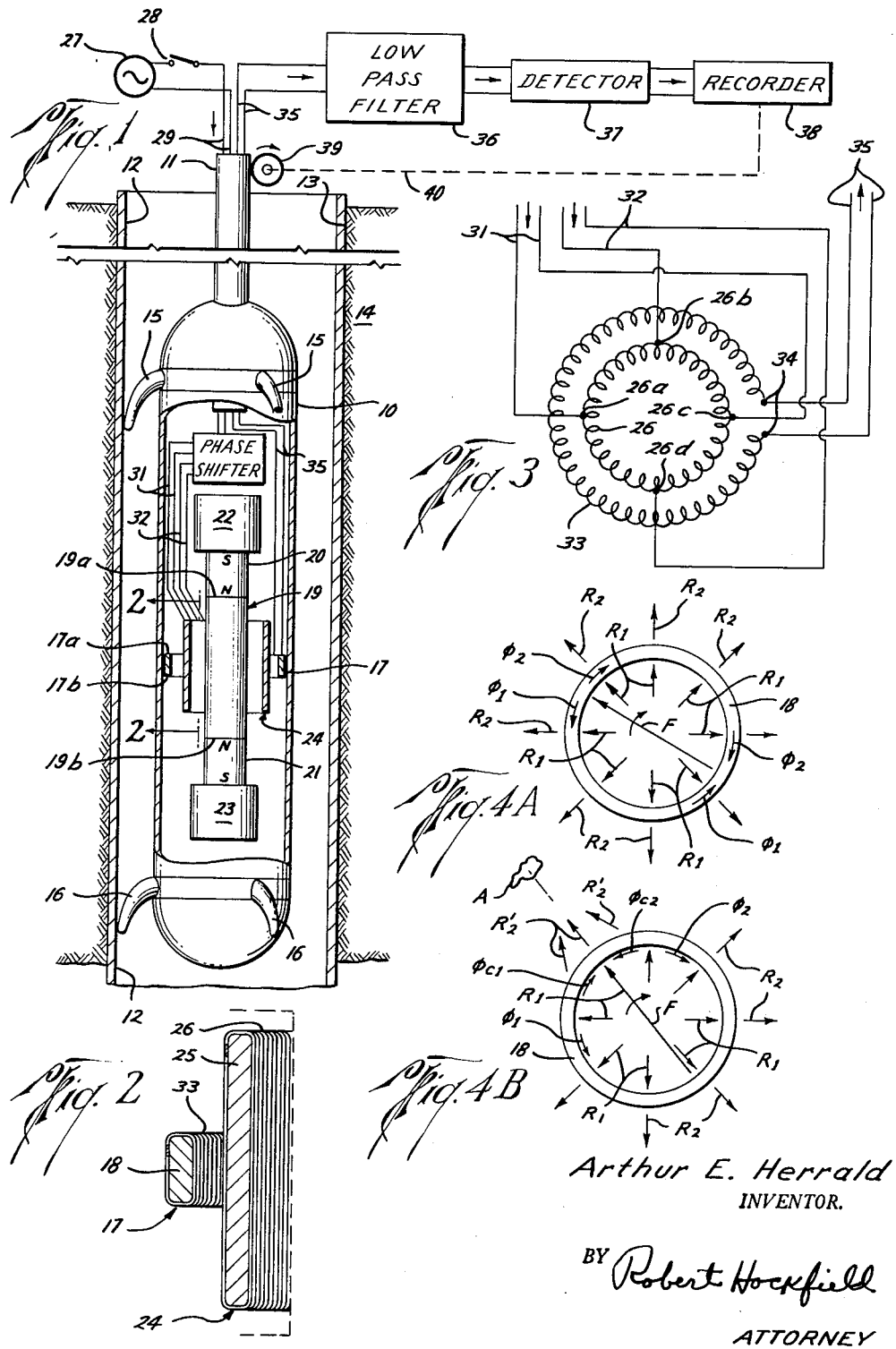

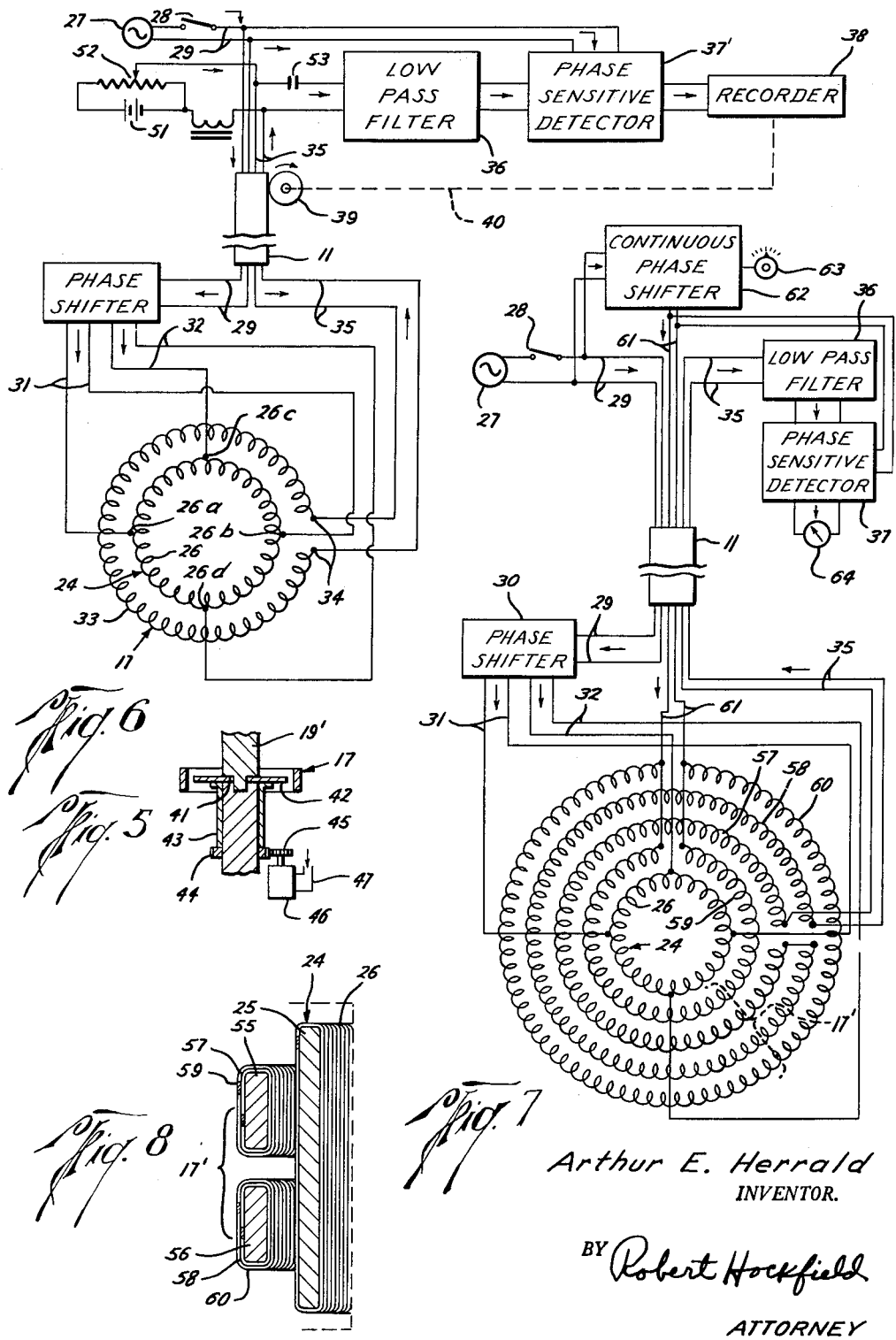

3,056,920
SYSTEMS FOR INSPECTING MATERIAL
Arthur E. Herrald, Houston, Tex., assignor to Schlumberger Well Surveying Corporation, Houston, Tex., a corporation of Texas
Filed July 15, 1959, Ser. No. 827,353
14 Claims. (Cl. 324—37)

This invention relates to nondestructive testing and, more particularly, pertains to new and improved systems for inspecting material for magnetic anomalies.

Various forms of inspection apparatus have been proposed for locating magnetic irregularities such as caused by corrosion or perforations in the wall of a pipe of ferromagnetic composition. For example, in using one type of apparatus, a magnetic field is applied to successive sections of the pipe under test to produce residual magnetism and, subsequently, a sensing coil is used to explore these sections in search of a variation in the pattern of residual magnetism indicative of an anomaly. While anomalies may be detected in this manner, small corrosion pits often cannot be found.

It is an object of the present invention, therefore, to provide new and improved systems for magnetically inspecting material to detect the presence of relatively small anomalies.

Another object of the present invention is to provide a new and improved magnetic anomaly detector of high sensitivity which is entirely efficient and reliable in operation.

These and other objects of the present invention are attained by a magnetic testing or examining system in which a magnetic sensing element is disposed adjacent to a material to be examined. Means are provided for establishing in the magnetic core of the sensing element a distribution of magnetic flux having components extending outwardly therefrom to intercept the material but which, in the absence of a magnetic anomaly in the material, has no component resulting in a flux gradient along the core, depending on the desired sensitivity. To detect flux gradients along the core which are created when a magnetic anomaly in the material changes the distribution of the outwardly extending flux components, the system also includes means for inducing oppositely-directed magnetic flux components at successive points extending along the core of the sensing element. Preferably, such oppositely-directed flux components converge at or diverge from a limited region of the core at any instant of time to increase sensitivity to a localized anomaly. Thus, a magnetic anomaly in the material under examination causes a change in the distribution of the outwardly extending flux components and, hence, a flux gradient along the core, which interacts with the oppositely-directed flux components along the core to induce a signal in a coil inductively coupled with the core whereby an indication of the magnetic anomaly may be obtained.

In applying apparatus embodying the present invention to the examination of a tubular member, the sensing element has a core of ring-like, ferromagnetic construction and is adapted to be disposed with its longitudinal axis in alignment with a longitudinal axis of the tubular member. In this geometry, the outwardly extending flux components pass radially from the core of the sensing element and intercept the tubular member while the oppositely-directed flux components extending along the core have an arcuate path. A rotating field is preferably employed to produce the oppositely-directed components.

In accordance with a specific embodiment of the present invention, the sensing element has a ferromagnetic core of ring-like configuration on which is wound a toroidal coil to develop a signal, upon rotation of a magnetic field within the ring-like core, indicative of a change in the distribution of the radially extending flux components.

According to another embodiment of the invention, a pair of such ring-like sensing elements is disposed in axially spaced relation and each carries a sensing coil. The two sensing coils are connected to the indicator means in series opposing relation to obtain differential indications.

The novel features of the present invention are set forth with particularity in the appended claims. The present invention, both as to its organization and manner of operation, together with further objects and advantages thereof, may best be understood by reference to the following description taken in connection with the accompanying drawings in which:

FIG. 1 is a schematic, elevational view of apparatus embodying the present invention shown in operative position within well casing, portions of the apparatus being shown cutaway and in section to reveal certain interior details;

FIG. 2 is an enlarged view in partial cross section of the portion of the apparatus of FIG. 1 delineated by line 2—2;

FIG. 3 is a schematic, electrical circuit representation of a portion of the apparatus illustrated in FIG. 1;

FIGS. 4A and 4B are simplified diagrammatic representations of a portion of the apparatus of FIG. 1 and demonstrate two different conditions of operation;

FIG. 5 illustrates a modification which may be made to the apparatus of FIG. 1 in accordance with another embodiment of the present invention;

FIGS. 6 and 7 are schematic, electrical circuit diagrams of additional embodiments of the present invention; and FIG. 8 is a view similar to FIG. 2, but representing the embodiment illustrated in FIG. 7.

In FIG. 1 of the drawings, apparatus embodying the present invention is shown to include a borehole instrument or housing 10 suspended by an armored electric cable 11 in well casing 12. Casing 12 extends downwardly through a borehole 13 drilled into earth formations 14. To exemplify the principles of the invention, the casing 12 is taken to be the material magnetically examined for flaws, such as are caused by corrosion. To examine the entire length of the casing 12, housing 10 is lowered and raised through it by means of a winch (not shown) upon which cable 11 is spooled and which operates in a conventional manner.

To maintain the housing 10 centered or in alignment with the longitudinal axis of casing 12, upper and lower centralizers 15 and 16 are provided. Any suitable form of centralizers may be employed and in the example illustrated, they are comprised of radially extending fingers constructed of a resilient material such as rubber. Although any number of fingers may be provided, suitable centering action can be achieved by using three fingers equally distributed about the axis of housing 10.

Housing 10 is constructed of a nonmagnetic material such as Bakelite or stainless steel designed in a known manner so as to be fluid-tight thereby to preclude the entry of liquids that might be present within well casing 12. If desired, a conventional pressure compensating bellows (not shown) may be provided in order to maintain the liquid pressure within the housing 10 equal to the ambient pressure of the liquid in which it is immersed.

Supported in a central region within and in concentric relation with respect to the housing 10 is a sensing element 17 of ring-like configuration. Sensing element 17 is of such an outer diameter that it is relatively close to the cylindrical wall of housing 10 and its inner diameter is chosen so that certain magnetic circuit elements, to be described later, can be inserted. Upper and lower end surfaces 17a and 17b define respective horizontal planes which are perpendicular to the longitudinal axis of housing 10.

As best seen in FIG. 2, sensing element 17 includes a closed annular core 18 constructed of a ferromagnetic material of high permeability, such as iron. If desired, it may be composed of a stack of flat rings of transformer iron or of material such as a ferrite having a rectangular hysteresis characteristic. In any event, the core material is selected so that it can be saturated upon the application of a magnetizing force of a selected value but exhibits a very low magnetomotive force drop in a radial direction, for reasons to be apparent in the discussion to follow.

The apparatus constructed in accordance with the present invention further comprises a first magnetic circuit element which provides a steady magnetic field and includes a central portion 19 of cylindrical configuration constructed of a ferromagnetic material such as soft iron. Portion 19 has a diameter smaller than the inner diameter of sensing element 17 and it is positioned coaxially inside the sensing element. It is long enough to extend well beyond the planes defined by the upper and lower surfaces 17a and 17b of the sensing element, and it terminates at end surfaces 19a and 19b which are flat and parallel to one another. Cylindrical permanent magnets 20 and 21 of the same diameter as member 19 are supported with their flat ends in engagement with the upper and lower surfaces 19a and 19b of member 19 and with like magnetic poles adjacent to respective ones of the surfaces 19a and 19b. As illustrated in FIG. 1, there are the north magnetic pole portions of the magnets. The permanent magnets may be constructed of a conventional alloy of aluminum, nickel and cobalt, commonly referred to as alnico, providing a desired magnetic flux intensity. Preferably, the flux intensity in a radial direction is maintained uniform along the central portion 19. If desired, the magnetic circuit element may utilize electromagnets rather than permanent magnets 20, 21.

The magnetic circuit element further comprises a pair of flux-return pole pieces 22 and 23 constructed of a material such as soft iron of cylindrical configuration. Pole pieces 22 and 23 are positioned with their flat end surfaces in engagement with respective south-pole surfaces of the magnets 20 and 21. They have a diameter larger than the diameter of members 19–21 so as to provide a radial magnetic path of relatively low reluctance to the inner wall of casing 12, as compared to a path which might exist between the casing and any of circuit element portions 19, 20 or 21. Accordingly, the magnetic circuit element 19–23 establishes a distribution of steady magnetic flux components that extend radially through sensing element 17 and intercept the casing 12. Of course, radial components from the virtual flux source 19 exist above and below the sensing element 17. Also, radial flux components extend from the casing to the flux-return pole pieces 22 and 23 thereby completing the various magnetic paths.

The apparatus featuring the present invention further includes a second magnetic circuit element 24 to provide a rotating magnetic field. Element 24 is of generally ring-like or annular configuration of appropriate diameter so that it can be supported between cylinder 19 and sensing element 17. As seen in FIG. 2, element 24 includes an annular core 25 of a ferromagnetic material, such as soft iron, on which a toroidal coil 26 of a conductive, insulated wire is wound. If desired, core 25 may be of laminated construction.

Coil 26 is appropriately energized to provide a rotating magnetic field diametrically positioned relative to the sensing element 17. For example, as shown in FIG. 1, an adjustable source 27 of alternating current provided with an operating switch 28 is connected by insulated conductors 29 of cable 11 to a conventional phase shifter 30 which may be positioned within housing 10. The phase shifter 30 operates in a well-known manner to develop two currents at respective pairs of conductors 31 and 32 which are shifted in phase from one another by 90°. As seen in FIG. 3, coil 26 is a closed toroid and conductors 31 are connected to diametrically opposed taps 26a, 26c while conductors 32 are connected to diametrically opposed taps 26b, 26d that are displaced 90° relative to the first-mentioned connections. Although a two-phase system has been shown, obviously any desired phasing may be employed. For example, current from a three-phase source can be used. In that case, connections are made to taps displaced 120° from one another for current at each phase, while the pairs of taps are shifted from one another by 60° as is well known. With either arrangement, magnetic circuit element 24 produces a rotating diametric field having two parallel flux-return paths that extend along the halves of the sensing element 17 which correspond at any instant to the rotation position of the diametric field. Accordingly, oppositely-directed magnetic flux components are established in respective halves of element 17, which components extend within and along the core 18 of the sensing element and have a magnitude and sense at any given point in the core effectively varying with time.

To obtain indications in response to anomalies in the well casing 12, a toroidal coil 33 of conductive, insulated wire is wound on core 18 (FIG. 2). As shown in FIG 3, coil 33 is open, thus providing a pair of terminals 34 to which a pair of conductors 35 are connected. As seen in FIG. 1, conductors 35 extend through cable 11 to a low-pass filter 36 at the surface of the earth. Filter 36 is of conventional construction arranged to attenuate signal components of frequencies higher than that of source 27, for example, higher than a source frequency of, say 60 cycles per second while translating with substantially no attenuation signal components of frequencies in a range including that of source 27. Filter 36 is connected to an input circuit of a suitable detector 37. The detector 37 is, in turn, connected to a conventional recorder 38 in which the recording medium is driven in proportion to movement of the housing 10 through casing 12 by means of a measuring wheel 39 that is mechanically coupled to cable 11 and to the recorder 38 by an appropriate linkage schematically illustrated by broken line 40.

To condition the apparatus embodying the present invention for operation, switch 28 is closed so that source 27 supplies current to coil 26. Thus, in addition to the radial flux distribution of the steady D.C. or unidirectional magnetic field, represented by a series of arrows $R_1$, $R_2$ in FIG. 4A extending transversely through sensing element 17, there is generated a diametric exciting field represented by arrow F. Exciting field F has two, oppositely-directed flux-return paths, designated by respective arrows $\phi_1$ and $\phi_2$ that extend through the core 18 in semicircular arcs. Since the field F rotates, for example, in a clockwise direction, the exciting flux components $\phi_1$ and $\phi_2$ effectively rotate clockwise through the core. Considering any incremental portion of the core, it is evident that the exciting flux component in such portion varies in intensity with time. The ampere-turns of coil 26 may be selected to produce a resulting exciting flux in core 18 of just high enough intensity to drive portions of the core to saturation. Thus, as the diametric field F rotates, regions of saturation in the core, typically located in the diametral plane of field F, also rotate continuously, everywhere remaining in step with rotation of the exciting field. If the sensing element has no regions which carry any circumferential component of magnetization due to distortion of the radial magnetic flux $R_2$ provided by magnetic circuit element 19–23, the condition represented in FIG. 4A prevails. This occurs, of course, if there is no irregularity or anomaly in well casing 12 in the section opposite sensing element 17 which appears as a variation in magnetic characteristics, such as a contrast in permeability.

As the housing 10 his drawn through the casing, an anomaly, represented schematically by region A in FIG. 4B, may be encountered. Consequently, the symmetry of the radial magnetic flux $R_2$ that extends from the ring is disturbed. Flux lines are diverted, as shown by arrows $R'_2$ in FIG. 4B, and circumferential components of magnetization $\phi_{c1}$ and $\phi_{c2}$ are induced in the core 18 of the sensing ring 17. Each time the diametric field F is alined with the region of the anomaly A, circumferential flux components $\phi_{c1}$ and $\phi_{c2}$ alter the condition of saturation. It is evident that saturation occurs in the core 18 a little in advance of the location where it might have occurred in the absence of the anomaly A when $\phi_2$ and $\phi_{c1}$ are in aiding relation, while for a short time after the diametric flux passes alinement with the anomaly, the exciting flux component $\phi_1$ taking the trailing path through the ring 17 is still assisting the circumferential flux component $\phi_{c2}$. Hence, the saturated condition will persist slightly longer than it would in the absence of the circumferential flux components produced by anomaly A. Of course, the reverse condition prevails when the diametric field F has progressed 180° from the position shown in FIG. 4B. In other words, the onset of saturation is delayed and the persistence is shortened.

As mentioned earlier, core 18 is so constructed that the magnetomotive force drop in the radial direction is small and the core 18 re-radiates flux lines which are normal to its outer surface. In general, since the inner and outer surfaces of the core 18 coincide with magnetic equipotentials, in the absence of an anomaly, there are no circumferential variations in the flux components of field F. Accordingly, no voltage is induced in the toroidal coil 23 wound on core 18 having the fundamental frequency, that of the rotation of diametric field F. An unwanted voltage may be present of a frequency in harmonic relation to that of the rotation frequency. However, since coil 33 is connected to low-pass filter 36, such unwanted signal is minimized, if not altogether eliminated.

When an anomaly A is present, a signal voltage of the fundamental frequency is generated in coil 33. Detector 37 to which the signal from coil 33 is supplied has an output voltage amplitude dependent upon the magnetic effect or size of the anomaly. This voltage is supplied to recorder 38 thereby to produce an indication depicting both the size and depth of the anomaly in the casing.

A change in the distribution of the radially extending D.C. flux components will occur as a consequence of relatively small irregularities such as caused by corrosion or perforations. Accordingly, apparatus embodying the present invention affords a highly sensitive indication of small anomalies wherever located along or circumferentially within a pipe or casing.

As an alternative to the toroidal circuit element 24, a stack of flat, annular laminations similar to that utilized in an electric motor may be utilized. In such case, slots may be provided in these laminations to carry a distributed winding spaced around the circumference of the stack, located within and concentric with the sensing ring, and supplied with an alternating potential.

Another way of generating the diametric field is illustrated in FIG. 5. In the vicinity of sensing element 17, a modified cylindrical member 19' of soft iron is provided with a deep, annular groove 41 defining a reduced diameter shaft which is received through a central journal in a bar magnet 42. The magnet is sufficiently long so that its opposite poles extend closely adjacent to diametrically-opposed portions of sensing element 17. It is co-rotatably connected to a hollow shaft 43 rotatably supported about cylinder 19'. Shaft 43 is connected at its lower end to a ring gear 44 that is in meshing engagement with a pinion 45 driven by an electric motor 46. By means of cable conductors 47, an electric current is supplied to the motor 46 thereby to rotate the bar magnet 42. Thus, the same type of operation described in connection with magnetic element 24 in the embodiment of the invention illustrated in FIGS. 1–3 is achieved.

Further, although in the embodiment illustrated in FIG. 1, it is assumed that the rotating field produced by circuit element 24 is of sufficient intensity to cause a circumferential field component that partially saturates the core 18 of sensing ring 17, the apparatus may operate effectively if the field is insufficient to cause saturation. In that event, an anomaly produces an incremental change in permeability regionally in core 18, which is detected by use of the modulating magnetic field F and indications thereof may be obtained in the manner described above.

On the other hand, as shown in FIG. 6, saturation may be facilitated by the use of a source of unidirectional current, such as a battery 51, connected to a potentiometer 52, in turn, coupled to leads 35. Thus, unidirectional current may be supplied to the winding 33 of sensing element 17. A blocking condenser 53 is provided on the input side of low-pass filter 36 so as to prevent unidirectional current flow into the filter while permitting information signals to pass. By means of potentiometer 52, a bias current is fed to winding 33 of such magnitude that its core 18 is almost saturated with unidirectional flux. Consequently, the rotating field F produced by magnetic circuit element 24 need only be sufficiently strong to complete the process of saturating the core 18. It is thus possible to employ a weaker rotating field and in some applications the use of core 25 may not be necessary.

Although in the illustration of an application of the present invention such as shown in FIG. 1, indications are obtained of simply the magnitude of the signal supplied through low-pass filter 36, it is feasible to record the relative position of anomalies in an angular sense. To this end, detector 37' of the phase sensitive type is supplied with a reference signal from source 27. Assuming, for example, that uniform perforations in a spiral shot pattern are to be indicated, the output of detector 37' gives large, small, negative and positive output signals depending upon the quadrature relation of successive shots and such signals may be recorded. Alternatively, a cathode ray type display may be provided in which the information is superimposed on a circular sweep synchronized with the rotating field in a conventional manner. Thus, the angular position of one anomaly with respect to another may be indicated.

In the embodiment of the invention illustrated in FIG. 7, a modified sensing element 17' is employed. As best seen in FIG. 8, element 17' is comprised of two individual elements of annular configuration disposed in end-to-end or axially spaced relation in a position similar to that occupied by sensing element 17 shown in FIG. 2. The two elements have respective ring-like cores 55 and 56, each similar to core 18. Toroidal windings 57 and 58 are wound upon the corresponding cores 55, 56, each of which is similar to the winding 33 of FIG. 2. The cores also carry respective open, toroidal windings 59 and 60 wound over the corresponding windings 57 or 58. Alternatively, if desired, windings 57 and 59 may be interwound, as may windings 58 and 60. As shown in FIG. 7, the windings 57 and 58 are connected in series opposition and are coupled by conductors 35 to low-pass filter 36. The windings 59 and 60 are connected in parallel as shown (or alternatively in series) and are coupled by additional conductors 61 of cable 11 to a continuous phase shifter 62 provided with a manual control 63. An energizing signal for the phase shifter 62 is derived from source 27 and the phase shifter 62 operates in a known manner to provide a signal at conductors 61 whose phase in the range from 0° to 360° is dependent upon the setting of control 63.

The amount of current supplied to the windings 59 and 60 may be just less than sufficient to cause saturation of the cores 55 and 56, while the amount of current supplied to winding 26 produces a rotating field which, in regions of aiding phase relation with the auxiliary fields is just sufficient to produce saturation. Thus, in operation, the auxiliary fields provided by the windings 59 and 60 cause saturation of the cores 55 and 56 to occur opposite a particular diameter where the rotating field F is periodically sufficient along such diameter to aid the auxiliary fields in producing saturation. By varying the phase angle of the bias current by means of control 63, the diameter at which saturation occurs to yield maximum sensitivity of the anomaly detector can be rotated so as to produce an angular search about the interior of a pipe under examination. When an anomaly is encountered, a signal is produced in a manner similar to that described in connection with the embodiment of FIG. 1 and an indication signal is supplied to indicator 64.

One of the advantages in using two sensing rings of the type illustrated in FIGS. 7 and 8 is that the third harmonic component of voltage induced in the signal windings 57 and 58 due to nonlinearities is cancelled because these windings are in series opposition. Moreover, extraneous signals which might be caused by eccentering of the exploring apparatus are minimized if not altogether eliminated. Of course, when an anomaly occurs opposite either of the cores 55 or 56, an information signal is obtained and an appropriate display is made. Accordingly, in addition to the high sensitivity attributable to apparatus embodying the present invention, the embodiment illustrated in FIGS. 7 and 8 may be utilized to examine a long tubular member without the use of centralizers. Furthermore, anomalies which appear in a longitudinal direction but which do not exhibit contrasts with respect to the radial inspection lines, such as may be caused by casing collars, can easily be detected.

Of course, the spurious third harmonic signal may be eliminated in either embodiment by designing filter 36 to reject only the third harmonic frequency while passing higher and lower frequencies.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

What is claimed is:

1. Apparatus for magnetically examining a tubular member comprising: a ring-like, closed sensing element having an annular ferromagnetic core; means for supporting said sensing element in longitudinally aligned relation to the tubular member; and means for establishing in the core of said sensing element a distribution of magnetic flux components extending radially from said core to intercept the tubular member and a rotating magnetic flux component extending circumferentially along said core; said sensing element including toroidal coil means on said core for deriving a signal in response to a change in the distribution of said radially extending flux components resulting from a magnetic anomaly in the tubular member.

2. Apparatus for magnetically examining an elongated tubular member comprising: a ring-like, closed sensing element including a ferromagnetic core adapted to be disposed in axially alined relation within the elongated member; means for displacing said sensing element longitudinally relative to the elongated member while maintaining said alined relation; means for establishing in said core of said sensing element a distribution of magnetic flux components extending radially from said core to intercept the elongated member and means for producing a rotating magnetic flux component extending circumferentially within said core; said sensing element including a toroidal coil on said core for deriving a signal in response to a change in the distribution of said radially extending flux components resulting from a magnetic anomaly in the elongated member.

3. Apparatus for magnetically examining an elongated cylindrical member comprising: a sensing element having an annular ferromagnetic core defining a longitudinal axis; means for displacing said sensing element longitudinally within the elongated member with said longitudinal axis extending in substantially the same direction as the longitudinal axis of the elongated member; means for establishing in the core of said sensing element a uniform distribution of magnetic flux components extending radially relative to said longitudinal axis to intercept the elongated member; and means for rotating a magnetic flux component extending circumferentially along said core about said longitudinal axis; said sensing element including a toroidal coil on said core sensitive to interaction of said radially extending flux components and said rotating flux component for deriving a signal in response to a change in the distribution of said radially extending flux components resulting from a magnetic anomaly in the elongated member.

4. Apparatus for magnetically examining an elongated member comprising: a ring-like sensing element including an annular core of ferromagnetic material; means for positioning said core in radially spaced relation to the elongated member; a first magnetic circuit element disposed, at least in part, within said sensing element for establishing in said core a uniform distribution of magnetic flux components extending radially therefrom to intercept the elongated member; a second ring-like magnetic circuit element disposed, at least in part, between said sensing element and said first magnetic circuit element for establishing a rotating magnetic field having a flux component extending circumferentially along said core; said sensing element including toroidal coil means on said core for deriving a signal in response to a change in the distribution of said radially extending flux components resulting from a magnetic anomaly in the tubular member.

5. Apparatus for magnetically examining an elongated tubular member comprising: a ring-like sensing element of a given mean diameter and including a closed core constructed of a ferromagnetic material and a torodial coil thereon; means for disposing said sensing element within and in axially aligned relation to the elongated member; a first magnetic circuit element including a central portion of a mean diameter smaller than said given diameter, constructed of a ferromagnetic material, positioned substantially concentrically with respect to said sensing element so as to extend axially beyond said sensing element in either direction to opposed terminating surfaces, a pair of permanent magnet portions positioned with like magnetic poles adjacent to respective ones of the said terminating surfaces, and a pair of flux return pole pieces positioned adjacent to respective ones of said permanent magnet portions, said first magnetic circuit element thereby being adapted to establish a distribution of magnetic flux components extending radially through said core of said sensing element to intercept the elongated member; a second magnetic circuit element for establishing a magnetic flux component rotating about said core of said sensing element; and means coupled with said toroidal coil for deriving an indication in response to a change in the distribution of the aforesaid radially extending flux components resulting from a magnetic anomaly in the elongated member.

6. Apparatus for examining an elongated tubular member comprising: a ring-like sensing element including a closed ferromagnetic core and a toroidal coil thereon; means for disposing said sensing element within the tubular member in longitudinally aligned relation therewith; means for establishing in said core of said sensing element a distribution of magnetic flux components extending radially therefrom to intercept the elongated member and a magnetic flux component rotating within said core, said toroidal coil being sensitive to said rotating flux component to develop a signal having a characteristic indicative of a change in the distribution of the aforesaid radially extending flux components; and indicator means electrically coupled to said coil.

7. Apparatus for examining a tubular member comprising: a pair of ring-like closed ferromagnetic cores; means for disposing said cores adjacent to one another in axially spaced relation in substantially axially aligned relation within the tubular member; means for establishing in each of said cores a distribution of magnetic flux components extending radially therefrom to intercept the tubular member and a magnetic flux component rotating in said cores; a pair of generally toroidal, electrically connected coils, each wound on a respective one of said cores and sensitive to said rotating flux component for developing a signal having a characteristic indicative of a change in the distribution of the aforesaid radially extending flux components; and indicator means coupled differentially to said coils.

8. Apparatus for magnetically examining a tubular member comprising: a ring-like sensing element including an annular ferromagnetic core and a toroidal coil wound on said core; means for supporting said sensing element in axially-aligned relation to the tubular member; means for establishing in said core a magnetic flux field extending radially therethrough to intercept the tubular member; means for inducing a rotating magnetic flux field circumferentially along said core to produce a condition of magnetic saturation at successive locations along said core; and means coupled with said toroidal coil for deriving indications in response to changes in flux distribution of said radially-extending magnetic field.

9. Apparatus for locating magnetic anomalies from the interior of a tubular member comprising: an elongated support member adapted to be passed through the tubular member; a sensing element, including an annular ferromagnetic core mounted on said support member in axially-aligned relation thereto; an auxiliary coil coupled with said core; a sensing coil coupled with said core; means for establishing in said core a uniform distribution of magnetic flux components extending radially therethrough; means for inducing at a given frequency a rotating magnetic field within said core; means for energizing said auxiliary coil means with alternating current at said given frequency to induce an alternating magnetic field in said core, said rotating magnetic field and the peak value of said alternating magnetic field having combined densities sufficient to produce magnetic saturation in said core; means for selectively shifting the phase of said alternating current; and indicator means coupled with said sensing coil and said phase shifting means for deriving indications of the angular position of magnetic anomalies.

10. Apparatus for locating magnetic anomalies from the interior of a tubular member comprising: a support member adapted to be passed through the tubular member; first and second ring-like sensing elements, each including an annular ferromagnetic core mounted on said support member in spaced-apart, axially-aligned relation; first and second auxiliary coil means coupled with said first and second cores, respectively; first and second sensing coil means differentially coupled with said first and second cores, respectively; means for establishing in each of said cores a uniform distribution of magnetic flux components extending radially therethrough; means for inducing at a given frequency a rotating magnetic field in each of said cores; means for energizing said first and second auxiliary coil means with alternating current at said given frequency to induce an alternating magnetic field in said cores, said rotating magnetic field and the peak value of said alternating magnetic field having combined densities sufficient to produce magnetic saturation in said cores; means for selectively shifting the phase of said alternating current; and indicator means coupled with said first and second sensing coil means and said phase shifting means for deriving indications of the angular location of magnetic anomalies.

11. Apparatus for magnetically examining material comprising: a ferromagnetic core adapted to be disposed adjacent to a material to be examined; means for establishing a distribution of magnetic flux components extending transversely through said core to intercept the material; means for inducing an alternating steady-state magnetic field having flux components extending along said core in directions substantially normal to said transversely extending flux components; and means coupled with said core responsive to variations in the magnetic flux density along said core resulting from changes in the distribution of said transversely extending flux components for deriving indications of the presence of magnetic anomalies.

12. Apparatus for magnetically examining material comprising: a ferromagnetic core adapted to be disposed adjacent to a material to be examined; means for establishing a distribution of magnetic flux components extending transversely through said core to intercept the material; and means coupled with said core for deriving indications in response to changes in the distribution of said transversely extending flux components including means for inducing regions of alternate north and south magnetic polarity moving at a given rate along said core so that flux components extend along said core between said regions of magnetic polarity, and means responsive to variations in the magnetic flux density along said core.

13. Apparatus for magnetically examining material comprising: a ferromagnetic core adapted to be disposed adjacent to a material to be examined; means for establishing a first distribution of magnetic flux components extending transversely through said core to intercept the material; means adjacent to said core for establishing a second distribution of magnetic flux components transversely intercepting portions of said core at successive locations therealong and having their flux return paths therealong; and means coupled with said core responsive to interaction of said first flux components with said second flux components for deriving indications in response to variations in the distribution of said first flux components.

14. Apparatus for magnetically examining material comprising: an elongated ferromagnetic core adapted to be disposed adjacent to a material to be examined; a first magnetic circuit element disposed to one side of said core for establishing a first distribution of magnetic flux components extending transversely through said core to intercept the material; a second magnetic circuit element disposed to one side of said core for establishing a localized region in and moving along said core where a second distribution of magnetic flux components enters transversely of said core and divides into oppositely-directed flux components having portions of their return paths extending along said core; and means coupled with said core responsive to interaction of said first flux components with said second flux components for deriving indications of variations in the distribution of said first flux components.

References Cited in the file of this patent

UNITED STATES PATENTS

| | | |
|---|---|---|
| 2,467,306 | Habig | Apr. 12, 1949 |
| 2,602,833 | Swift | July 8, 1952 |
| 2,661,009 | Dunnegan et al. | Dec. 1, 1953 |
| 2,700,703 | Nordyke | Jan. 25, 1955 |
| 2,786,179 | Arnold et al. | Mar. 19, 1957 |
| 2,892,151 | Bender | June 23, 1959 |